(12) United States Patent  
Lee

(10) Patent No.: US 7,251,002 B2
(45) Date of Patent: Jul. 31, 2007

(54) MULTI-DOMAIN LIQUID CRYSTAL DISPLAY DEVICE HAVING PARTICULAR ELECTRIC FIELD DISTORTING MEANS

(75) Inventor: Won-Ho Lee, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 108 days.

(21) Appl. No.: 10/713,192

(22) Filed: Nov. 17, 2003

(65) Prior Publication Data
US 2004/0125297 A1    Jul. 1, 2004

(30) Foreign Application Priority Data
Dec. 31, 2002  (KR) ............... 10-2002-0088454

(51) Int. Cl.
*G02F 1/1337* (2006.01)
*G02F 1/1333* (2006.01)
(52) U.S. Cl. .................. 349/129; 349/110; 349/111
(58) Field of Classification Search ........... 349/129, 349/110–111
See application file for complete search history.

(56) References Cited

U.S. PATENT DOCUMENTS

| 5,710,611 | A | * | 1/1998 | Suzuki et al. ............. 349/129 |
| 5,781,262 | A | * | 7/1998 | Suzuki et al. ............. 349/128 |
| 5,940,056 | A | * | 8/1999 | Hanazawa et al. .......... 345/87 |
| 5,995,176 | A | * | 11/1999 | Sibahara ................ 349/44 |
| 6,100,953 | A | * | 8/2000 | Kim et al. .............. 349/129 |
| 6,313,898 | B1 | * | 11/2001 | Numano et al. ........... 349/129 |
| 6,335,776 | B1 | * | 1/2002 | Kim et al. .............. 349/129 |
| 6,449,025 | B2 | * | 9/2002 | Lee .................... 349/129 |
| 6,710,837 | B1 | * | 3/2004 | Song et al. ............. 349/143 |
| 6,778,244 | B2 | * | 8/2004 | Song et al. ............. 349/129 |
| 6,912,034 | B2 | * | 6/2005 | Nagano et al. ........... 349/144 |

FOREIGN PATENT DOCUMENTS

| JP | 5-224210 | 9/1993 |
| JP | 5-281545 | 10/1993 |
| JP | 7-159787 | 6/1995 |
| JP | 8-6028 | 1/1996 |
| JP | 9-281497 | 10/1997 |
| JP | 8-146428 | 6/1998 |

\* cited by examiner

*Primary Examiner*—Mike Qi
(74) *Attorney, Agent, or Firm*—McKenna Long & Aldridge LLP

(57) ABSTRACT

Disclosed is a multi-domain liquid crystal display device, by which a black matrix area is reduced to improve an aperture ratio in a manner that at least two slits or protrusions are provided on a domain boundary corresponding to an edge area of a pixel to distort an electric field so that a '−' type disclination line is induced. The present invention includes first and second substrates, gate and data lines arranged to cross with each other on the first substrate to define a pixel, a liquid crystal layer between the first and second substrates, first and second alignment layers on the first and second substrates for causing liquid crystal molecules in the liquid crystal layer to form as least two domain having different liquid crystal alignment directions in the pixel, and an electric field distorting means on a boundary of the two domains.

20 Claims, 8 Drawing Sheets

US 7,251,002 B2

MULTI-DOMAIN LIQUID CRYSTAL DISPLAY DEVICE HAVING PARTICULAR ELECTRIC FIELD DISTORTING MEANS

This application claims the benefit of the Korean Patent Application No. P2002-88454 filed on Dec. 31, 2002, which is hereby incorporated by reference in its entirety for all purposes as if fully set forth herein.

BACKGROUND OF THE INVENTION

1. Field of the Invention

The present invention relates to a liquid crystal display device, and more particularly, to a multi-domain liquid crystal display device to having an improved aperture ratio as well as reliable image quality.

2. Discussion of the Related Art

Lately, a liquid crystal display device is mainly used as a flat panel display device of low power consumption. The liquid crystal display device includes a thin film transistor array substrate, a color filter substrate bonded to the thin film transistor array substrate to leave a prescribed interval, and a liquid crystal layer between the thin film transistor array substrate and the color filter substrate.

A plurality of pixels are arranged matrix-like on the thin film transistor array substrate. And, a thin film transistor, a pixel electrode, and a capacitor are formed in each unit pixel. A common electrode for applying an electric field to the liquid crystal layer together with the pixel electrodes, RGB color filters implementing a real color, and a black matrix are formed on the color filter substrate.

Meanwhile, an alignment layer is formed on respective confronting surfaces of the thin film transistor array substrate and the color filter substrate. Rubbing is carried out on the alignment layer to align the liquid crystal layer in a uniform direction. In this case, liquid crystals rotate by dielectric anisotropy if the electric field is applied between the corresponding pixel electrode of each of the unit pixels of the thin film transistor array substrate and the common electrode on the color filter substrate, whereby light passes through the unit pixel or is cut off to display a character or image. Yet, the above-explained TN (twisted nematic) mode liquid crystal display device provides a narrow viewing angle. This is attributed to refractive anisotropy of liquid crystal molecules. In case of TN mode, light transmission for a horizontal viewing angle is symmetrically distributed but shows asymmetric distribution for a vertical viewing angle. Hence, a range of image inversion is generated from the vertical viewing angle so as to decrease the corresponding viewing angle.

In order to overcome such a viewing angle problem, a multi-domain liquid crystal display device is proposed to compensate the viewing angle, in which a pixel is divided into at least two domains, and a main viewing angle direction of each domain is differentiated like TDTN (two domain TN) or DDTN (domain divided TN). A fabrication method of a multi-domain liquid crystal display device includes photolithography and rubbing.

FIGS. 1A to 2B are cross-sectional views for implementing multi-domain. FIGS. 1A to 1C illustrate a method of implementing multi-domain using a rubbing direction, and FIGS. 2A and 2B show a method of implementing multi-domain using photo alignment.

Referring to FIG. 1A, an alignment layer 3 is coated on a substrate 1 on which such a plurality of patterns (not shown in the drawing) as thin film transistors and color filters. Rubbing is carried out on the alignment layer 3 in one direction using a rotating rubbing roll 5. In this case, rubbing is a process for determining an initial alignment direction of liquid crystal molecules.

Referring to FIG. 1B, a photoresist is coated on the alignment layer 3 rubbed in one direction. A photoresist pattern 7 is then formed by photolithography to expose a portion of the alignment layer 3.

Referring to FIG. 1C, the rubbing roll 5 is made to rotate reversely (in an opposite direction) so that the exposed portion of the alignment layer 3 which is not protected by the photoresist pattern 7 is rubbed in a direction opposite to that of the other portion of the alignment layer 3 protected by the photoresist pattern 7. Thus, a plurality of areas of which alignments differ in directions respectively can be formed in each pixel using the property that the rubbing directions of the alignment layer are changed according to the rotating direction of the rubbing roll.

Moreover, the multi-domain structure, as shown in FIG. 2B, can be achieved by a photo-alignment method of irradiating ultraviolet light (UV-rays) using a mask 7a blocking an alignment layer selectively instead of using the rubbing roll.

Namely, after an alignment layer 3 is uniformly coated on a substrate 1, rubbing is carried out thereon in one direction, as shown in FIG. 2A, using a rotating rubbing roll 5 to form a first pre-tilt angle θ1.

Thereafter, UV-rays are irradiated over a blocking mask 7a, as illustrated in FIG. 2B, to form a second pre-tilt angle θ2 smaller than the first pre-tilt angle θ1 in the exposed alignment layer 3. The above-explained steps are repeated to form multiple domains.

FIG. 3A is a diagram illustrating a pair of domains in one pixel and their corresponding rubbing directions, and FIG. 3B is a cross-sectional view illustrating alignment of liquid crystals along a bisecting line I-I' in FIG. 3A.

Referring to FIG. 3A, one pixel is divided into a first area A and a second area B. An upper substrate and a lower substrate are rubbed in directions opposite to each other, respectively, so that alignment directions of the upper and lower substrates are opposite to each other. In the drawing, a solid line indicates the rubbing direction of the upper substrate, and the dotted line indicates the rubbing direction of the lower substrate.

FIG. 3B is a cross-sectional view along a bisecting line I–I' in FIG. 3A, in which a schematic feature of aligned liquid crystals is shown.

Referring to FIG. 3B, because an alignment layer 13a on an upper substrate 10a and an alignment layer 13b on a lower substrate 10b are rubbed in directions opposite to each other, respectively, the alignment direction of liquid crystals 15 differs in 180° direction for each of the upper and lower substrates 10a and 10b. Moreover, the alignment directions of the liquid crystals in the area A are symmetric to those in the area B, taking into account each alignment direction boundary, at which the alignment directions are reversed, of the upper and lower alignment layers 13a and 13b. Hence, it is possible to form the two domain, of which alignment directions of the liquid crystals are opposite to each other, in the areas A and B, respectively. In this case, light transmitted through the domain boundary where the alignment direction of the liquid crystals is reversed is represented as a disclination line in the form of a black or white line. Namely, the light cannot pass through the liquid crystals at the domain boundary, but instead only passes through the upper substrate. Hence, if polarized directions of upper and lower polarizing plates attached respectively to the upper and lower substrates are normal or, perpendicular to each other, a black line appears on a screen. If they are in parallel, a white line appears on the screen. However, when a voltage is applied to the common electrode of the upper substrate and the pixel electrode of the lower substrate, the disclination line appearing on the screen draws an 'S' type curve. Namely, for a liquid crystal display device having a domain boundary in the middle of a pixel, as shown in FIG. 4, directions of liquid crystals 30 arranged in a domain boundary area are respectively changed by a fringe field generated between a corresponding pixel 21b and a neighboring pixel 21a or 21c (i.e., the pixel at the left or right of the corresponding pixel 21b). Specifically, the boundary plane of the rearranged liquid crystals 30, i.e., a disclination line 20, makes an 'S' type curve. In this case, in order to block the display failure (white or black line), a black matrix 25 is formed on this area. However, since the disclination line 20 makes the 'S' type curve, the area of the black matrix 25 must be wide enough to cover the entire "S" shaped disclination. Hence, an aperture ratio is reduced.

SUMMARY OF THE INVENTION

Accordingly, the present invention is directed to a multi-domain liquid crystal display device that substantially obviates one or more problems due to limitations and disadvantages of the related art.

An advantage of the present invention is to provide a multi-domain liquid crystal display device, in which a black matrix area is reduced to improve aperture ratio. In one aspect of the present invention, at least two slits or protrusions are provided on a domain boundary corresponding to an edge area of a pixel to distort an electric field so that a '−' type disclination line is induced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-domain liquid crystal display device according to the present invention includes first and second substrates, gate and data lines arranged to cross with each other on the first substrate to define a pixel, a liquid crystal layer between the first and second substrates, first and second alignment layers on the first and second substrates for causing liquid crystal molecules in the liquid crystal layer to form at least two domains having different liquid crystal alignment directions in the pixel, an electric field distorting means on a boundary of the two domains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 5A:
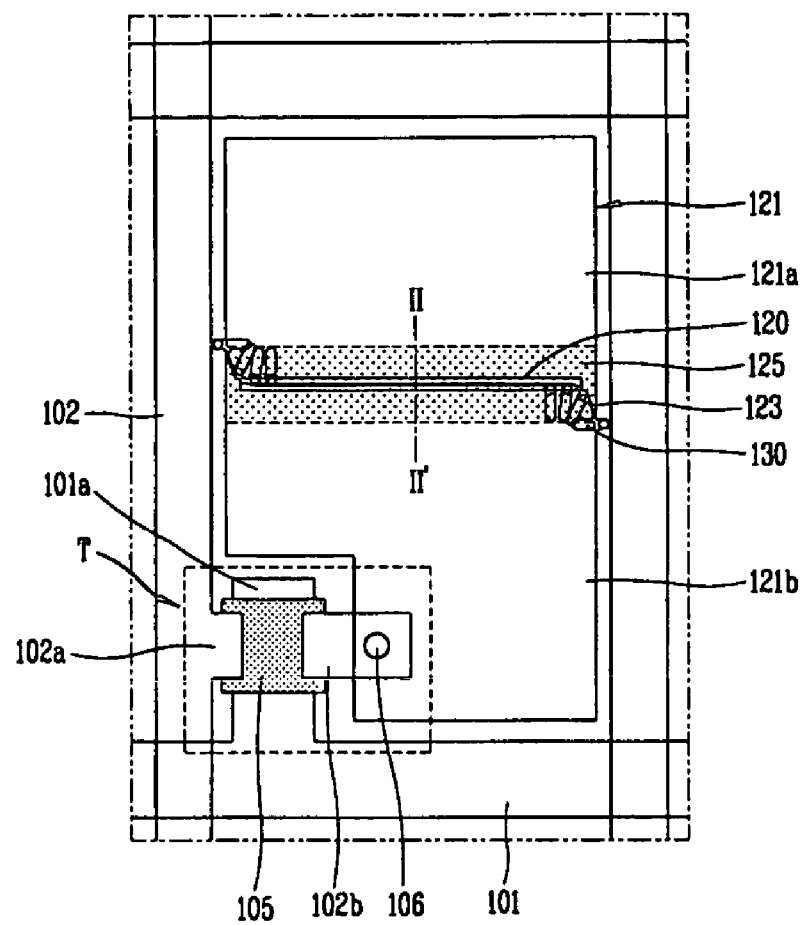
FIG. 5A is a layout of a multi-domain liquid crystal display device according to one embodiment of the present invention.
Figure 5B:
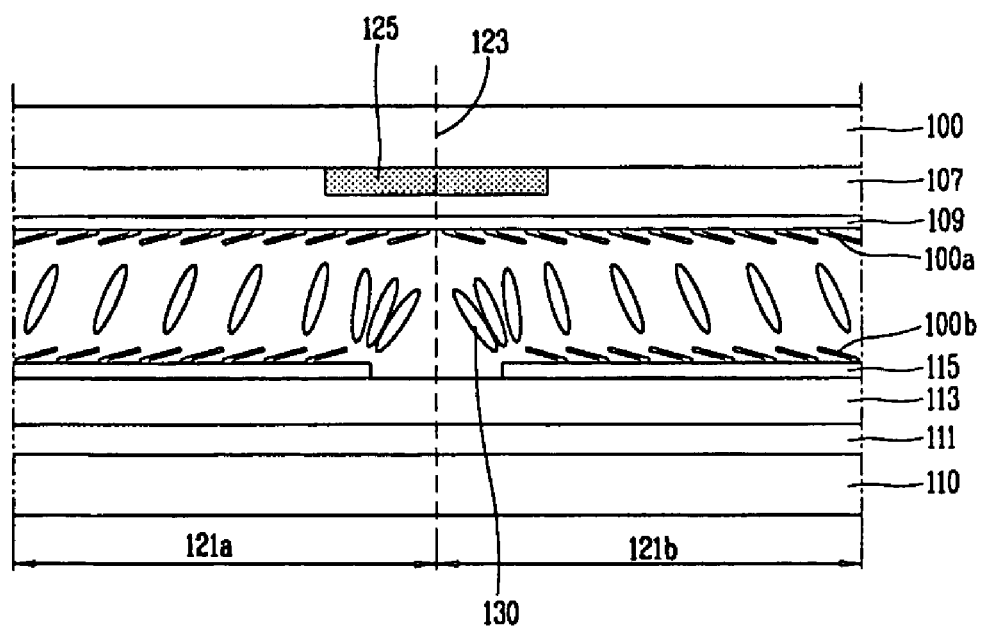
FIG. 5B is a cross-sectional view of a multi-domain liquid crystal display device along a bisecting line II–II' of FIG. 5A according to the present invention.

FIG. 5A is a layout of a multi-domain liquid crystal display device according to one embodiment of the present invention, in which a unit pixel having a linear ('−' type) slit in the middle of a pixel area is schematically shown as an electric field distorting means, and FIG. 5B is a cross-sectional view of a multi-domain liquid crystal display device along a bisecting line II–II' of FIG. 5A according to the present invention.

Referring to FIG. 5A and FIG. 5B, in a multi-domain liquid crystal display device according to one embodiment of the present invention, a pixel 121 is defined by a gate line 101 and a data line 102 that are arranged to cross with each other. A domain boundary is formed in the middle of the pixel 121 to provide a two-domain structure. A thin film transistor T is formed at a crossing between the gate and data lines 101 and 102. The thin film transistor T includes a gate electrode 101a extending from the gate line 101, a semiconductor layer 105 on the gate electrode 101a, and source/drain electrodes 102a and 102b on the semiconductor layer 105.

The two-domain structure includes first and second areas 121a and 121b differing from each other in alignment directions of liquid crystals. The differing alignment directions results from alignment treatment of an alignment layer. A linear or '−' type slit 120 is formed in the middle of the two-domain structure, except the slit 120 is not formed in an edge area of the pixel 121. The slit 120 functions as an electric field distorting means for distorting an electric field generated between an upper substrate 100 and a lower substrate 110. Moreover, a black matrix 125 is arranged in the middle of the pixel 121 to block any area of disclination 123.

A color filter 107 for realizing a color and the black matrix preventing light leakage are formed on the upper substrate 100. Only the black matrix 125 for the purpose of blocking the disclination area 123 is shown in the drawing. However, the black matrix 125 is also formed substantially over the gate line 101, the data line 102, and the thin film transistor T. Moreover, a common electrode 109 is formed on the color filter 107 to apply an electric field to liquid crystals.

A gate insulating layer 111 and a passivation layer 113 are formed on the lower substrate 110. Although not shown in the drawing in detail, the gate insulating layer 111 insulates the gate line 101 from the data line 102, and the passivation layer 113 is formed over the thin film transistor T for protection. Moreover, a pixel electrode 115 is formed on the passivation layer 113 to generate a vertical electric field onto a liquid crystal layer together with the common electrode 109. Upper and lower alignment layers 100a and 100b are formed on two confronting surfaces of the upper and lower substrates 100 and 110, respectively. An initial alignment state of the liquid crystals is determined by each rubbing direction of the alignment layers 100a and 100b. The alignment direction of each alignment layer may also be determined by photo alignment methods.

Figure 1A:
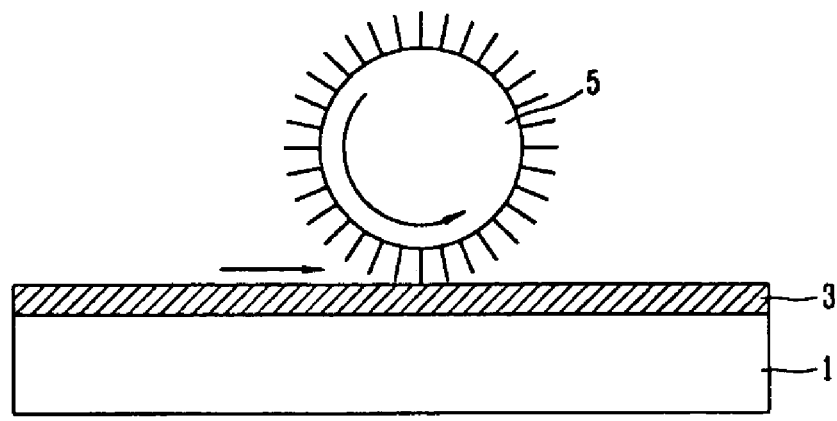
FIGS. 1A to 1C illustrate a method of implementing multi-domain using a rubbing method.
Figure 1B:
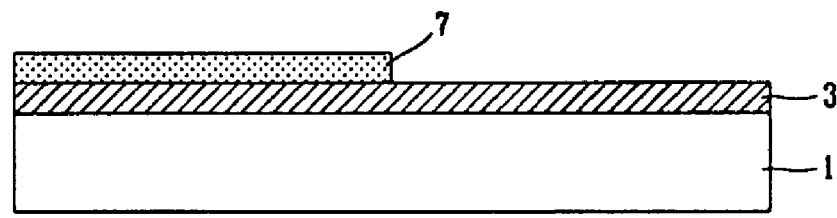
Figure 1C:
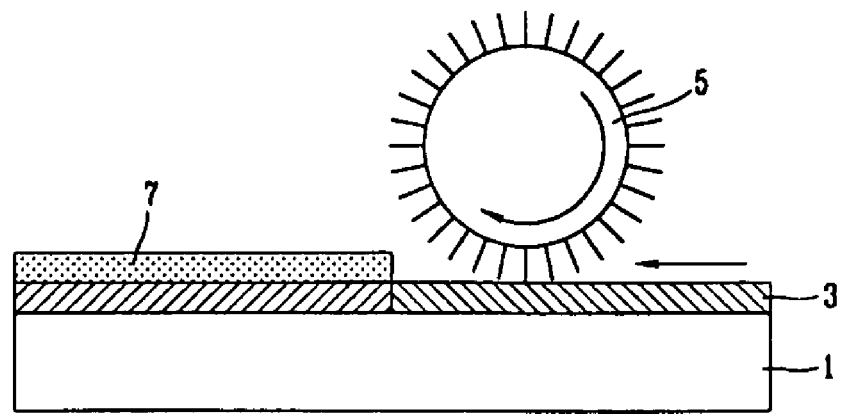
Figure 2A:
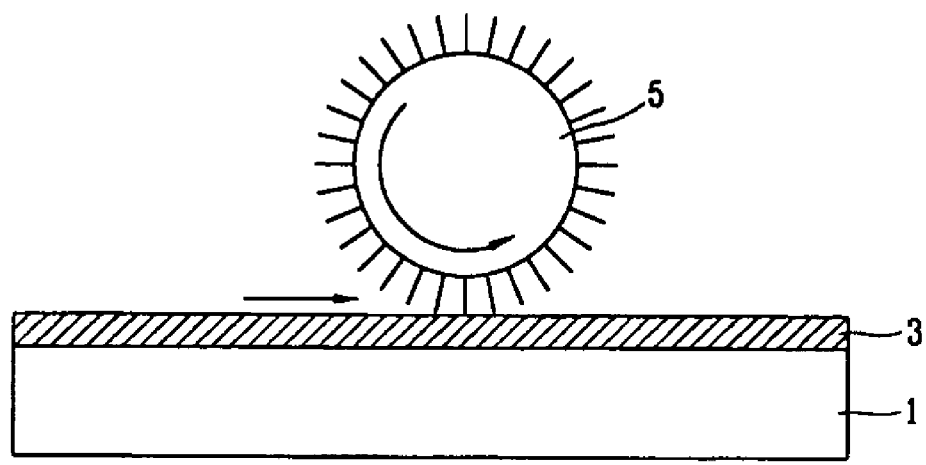
FIGS. 2A and 2B illustrate a method of implementing multi-domain using photo alignment.
Figure 2B:
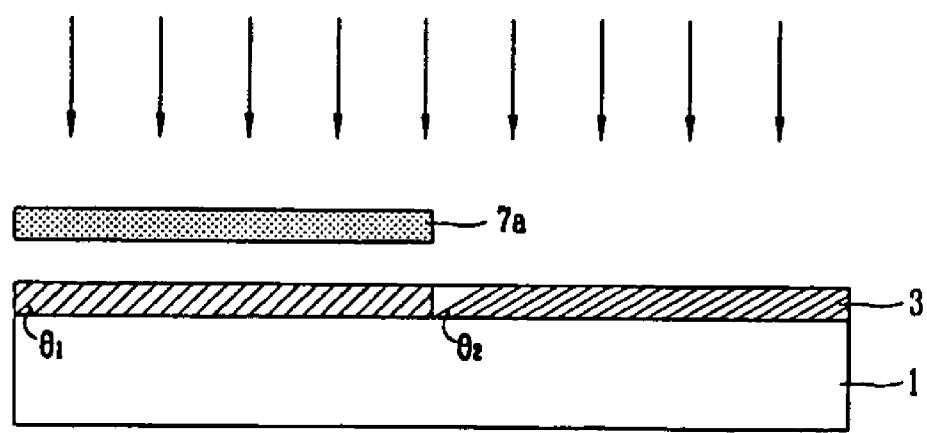
Figure 3A:
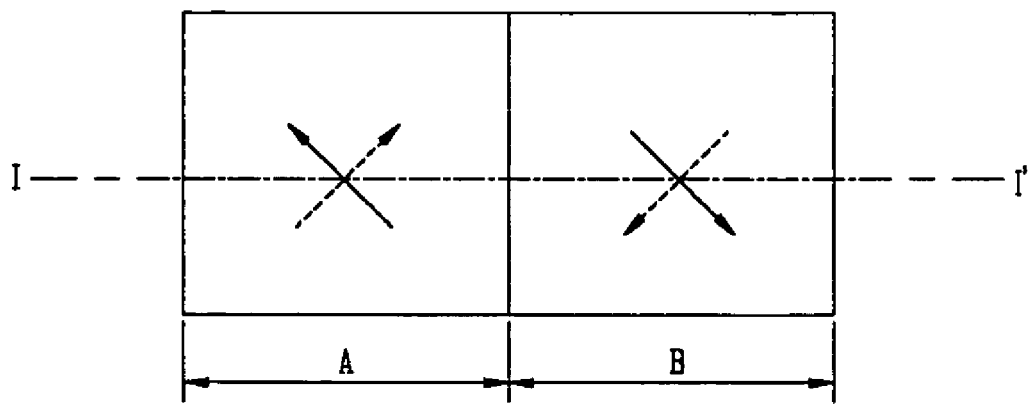
FIG. 3A is a diagram of a pair of domain in one pixel and their corresponding rubbing directions.
Figure 3B:
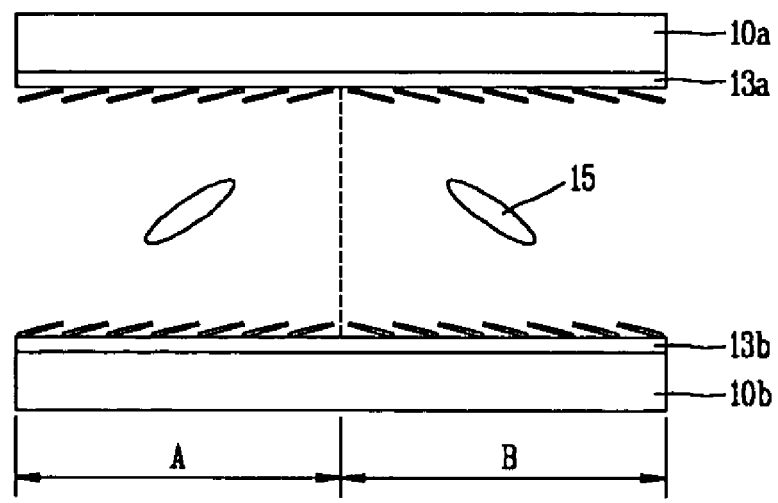
FIG. 3B is a cross-sectional view illustrating alignment of liquid crystals along a bisecting line I–I' in FIG. 3A.
Figure 4:
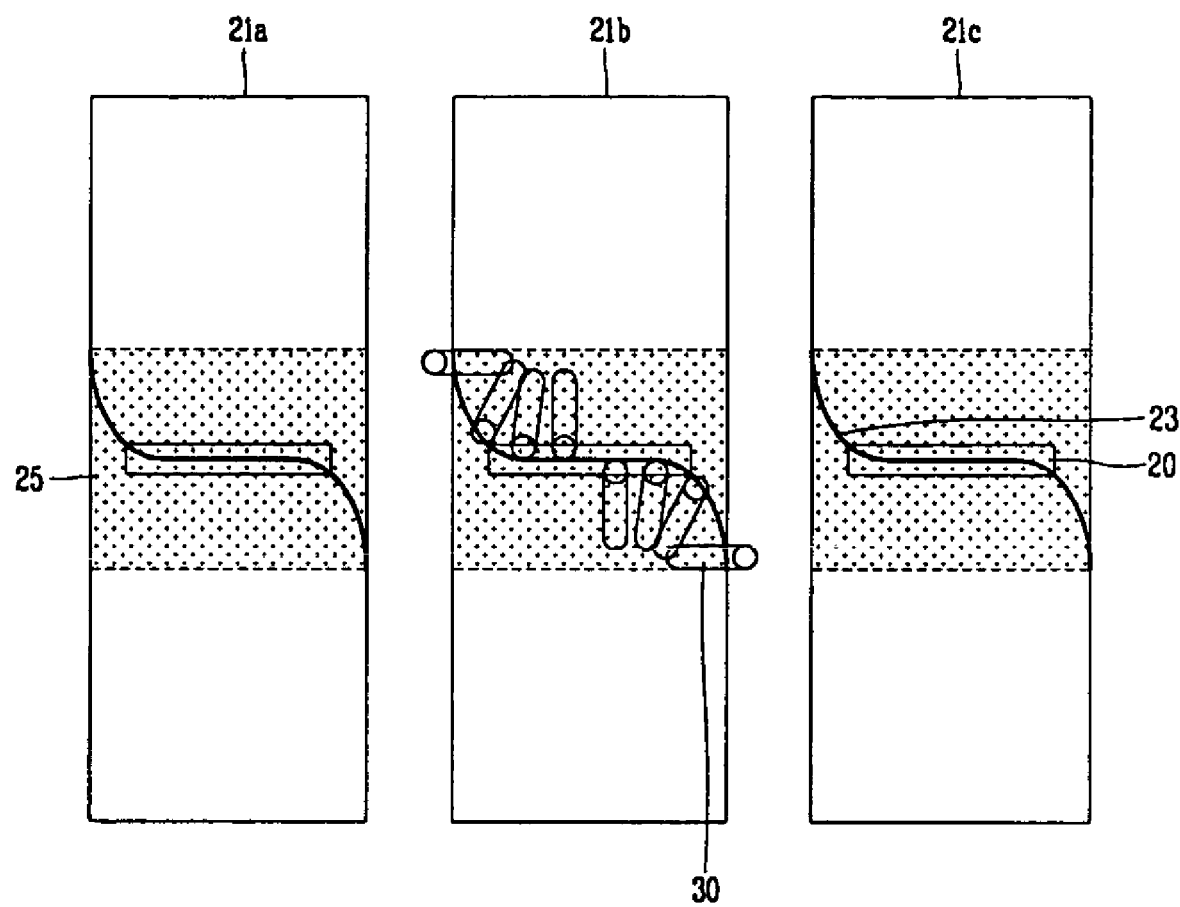
FIG. 4 is a schematic layout of a multi-domain liquid crystal display device according to a related art.

Moreover, a slit 120 is formed over the lower substrate 110 to correspond to the domain boundary. The slit 120 distorts the vertical electric field generated between the upper and lower substrates 100 and 110 and aligns the liquid crystals 130 that are arranged around the domain boundary along the electric field distorted by the slit 120. In this case, the liquid crystals 130 realigned by the slit 120 induce the linear or '−' type disclination line 123. Namely, as mentioned in the explanation of the related art, the fringe field generated between two neighboring pixels distorts the liquid crystals that are in the domain boundary so that the disclination line of 'S' type curve appears on the screen (Ref. FIG. 4). Yet, once the slit 120 is formed on the domain boundary, the electric field distorted by the slit 120 minimizes an effect of the fringe field to prevent the domain boundary, i.e., disclination area 123, from being curved.

Hence, the related art curved disclination line is changed to the '−' type disclination line, whereby an area of the black matrix 125 blocking the disclination line 123 may be reduced. Yet, in the above-described structure of FIG. 5, the disclination line 123 is still bent in the edge area of the pixel 121 where there is no slit 120 due to the effect of the fringe field. Hence, there is limitation in improving an aperture ratio by reducing the area of the black matrix.

Figure 6:
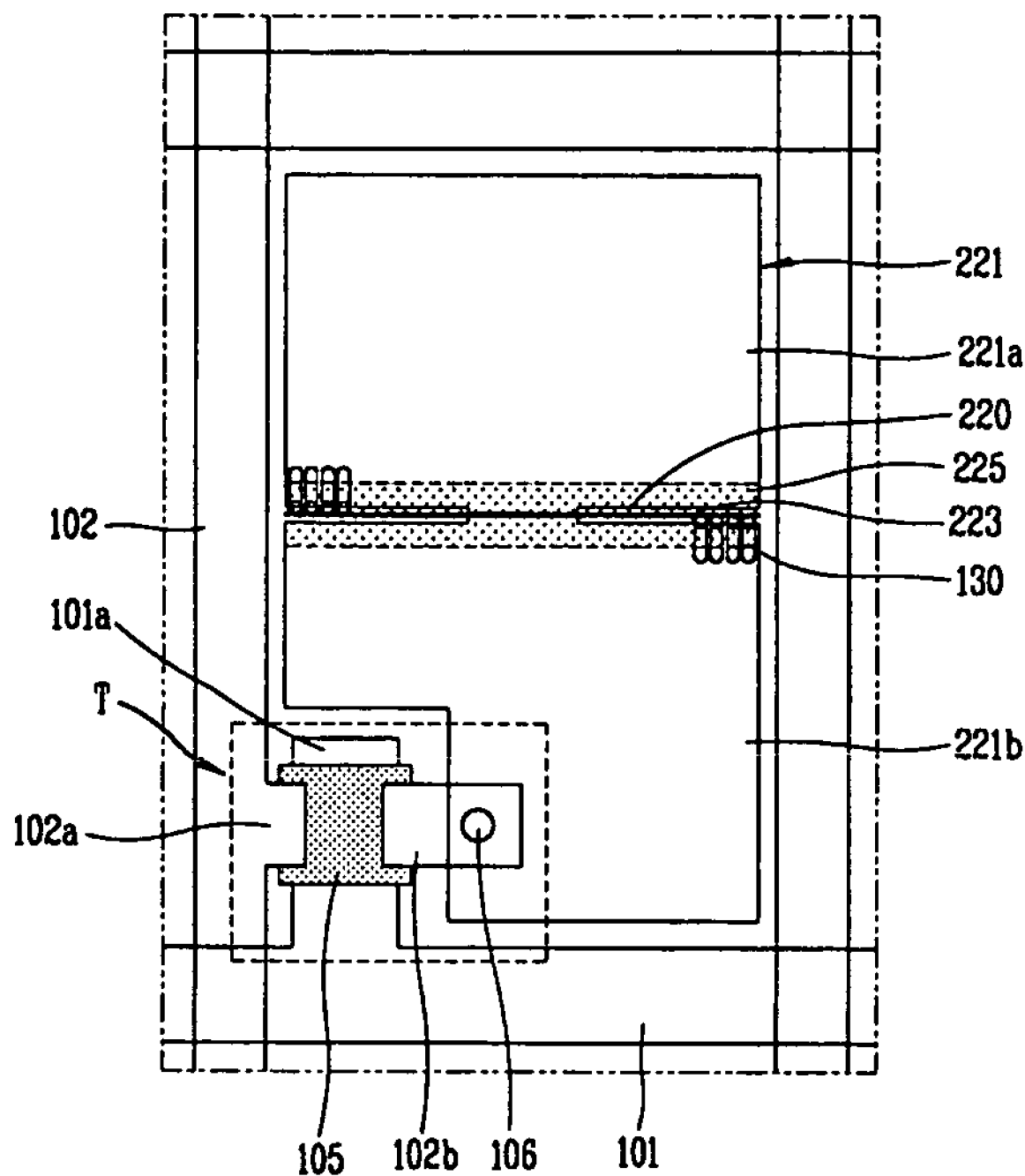
FIG. 6 is a layout of a multi-domain liquid crystal display device according to another embodiment of the present invention.
Figure 7:
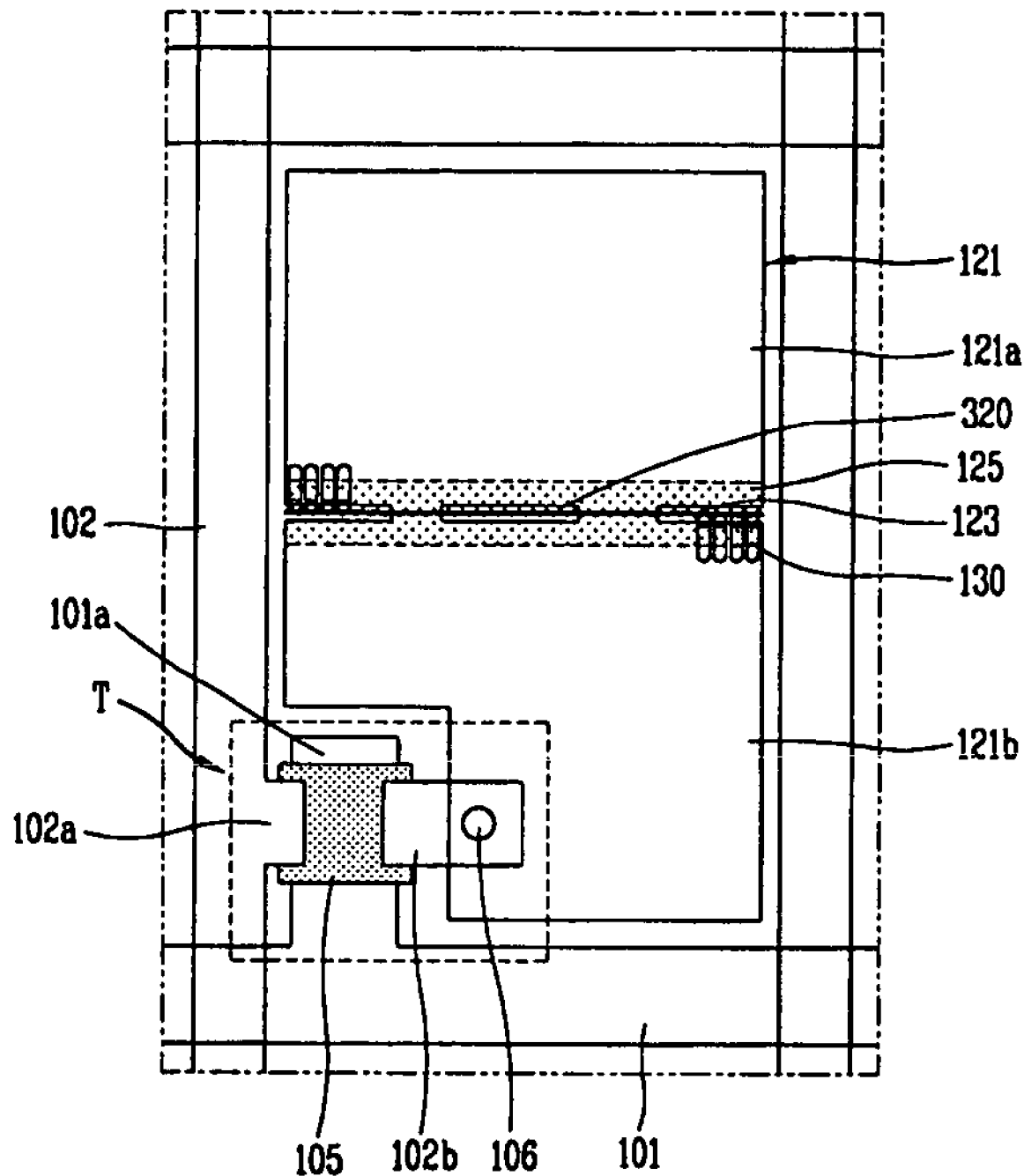
FIG. 7 is a layout of a multi-domain liquid crystal display device according to another embodiment of the present invention.

FIG. 6 is a layout of a multi-domain liquid crystal display device according to another embodiment of the present invention, and FIG. 7 is a layout of a multi-domain liquid crystal display device according to another embodiment of the present invention, in which an aperture ratio is improved by reducing an area occupied by a black matrix. All the elements in FIG. 6 and FIG. 7 except a shape of the slit are equivalent those of the former embodiment of the present invention in FIG. 4. Hence, only the differences are explained in the following.

In a multi-domain liquid crystal display device according to another embodiment of the present invention, a '−' type slit 220 or 320 is formed on each edge area of the pixel 221 on a domain boundary. The slit 220 induces a straight-line shape, like disclination line 223, on each edge area belonging to the domain boundary of the pixel. Namely, an effect of the fringe field working on the edge areas of the pixel due to the neighboring pixels is minimized to prevent the disclination line from being curved. Hence, it is possible to reduce an area of a black matrix 225 for blocking the disclination line 223, whereby an aperture ratio may be more improved.

The slit 220, as illustrated in FIG. 6, may include two parts, one abutting or adjacent to respective edge areas of the pixel along or on the domain boundary. The slit 320, as illustrated in FIG. 7, may include three parts, two abutting or adjacent to respective edge areas and a third at a central area of the pixel along or on the domain boundary.

The slit may be formed over the upper or lower substrate. In case of forming the slit over the upper substrate, the slit may be formed on the entire domain boundary. Namely, since the common electrode is formed on the entire corresponding surface of the substrate, it is possible to form the slit on the entire domain boundary for each pixel. However, since the pixel electrode is formed only on the pixel area of the lower substrate, the slit is formed on the domain boundary but at least one connecting part should be formed between the pixels separated by the slit.

The slit is an electric field distorting means for inducing the '−' type disclination line on the domain boundary. The slit may be replaced or accompanied by a protrusion. The protrusion may be formed on each of the upper and lower substrates as well.

Figure 8:
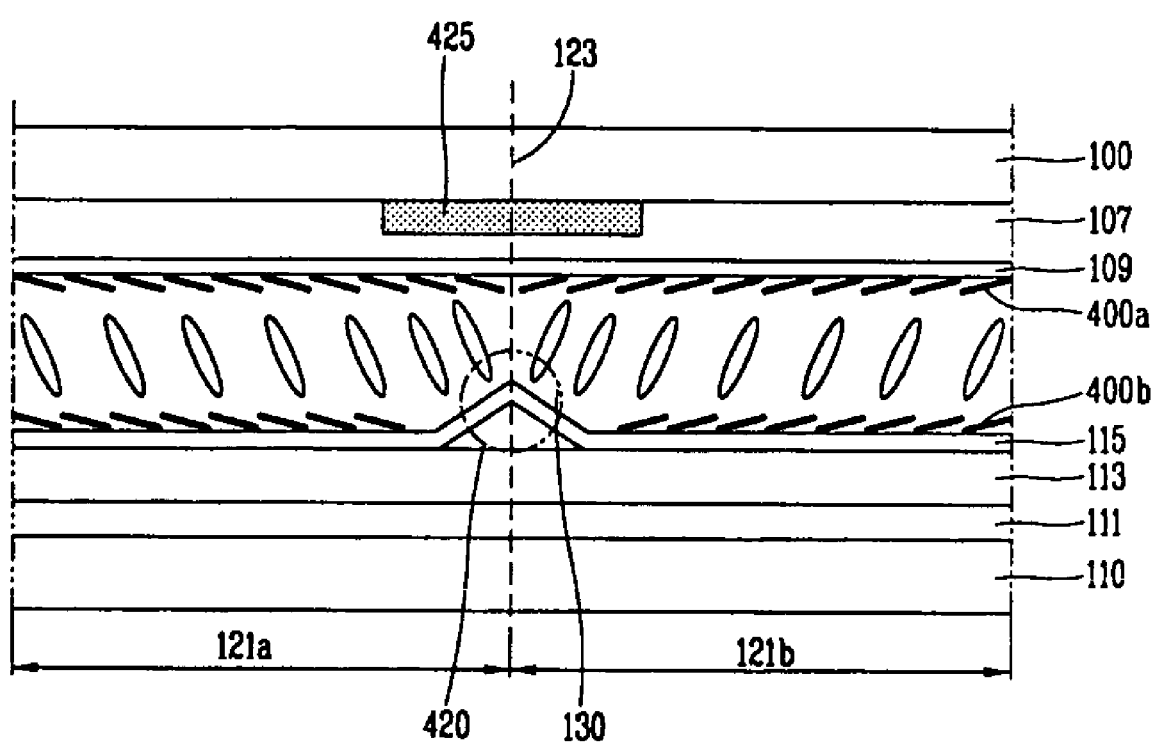
FIG. 8 is a cross-sectional view of a multi-domain liquid crystal display device according to another embodiment of the present invention.

FIG. 8 is a cross-sectional view of a multi-domain liquid crystal display device according to another embodiment of the present invention, in which a protrusion is formed on a lower substrate and all the elements but the protrusion are equivalent to those of the former embodiment of the present invention.

Referring to FIG. 8, a protrusion 420 is formed along a domain boundary on a lower substrate 110 including a pixel electrode 115. The protrusion 420, like the slit, distorts a vertical electric field generated by a common electrode 109 on an upper substrate 100 and a pixel electrode 115 on a lower substrate 110, and allows liquid crystals 130, which are arranged around the domain boundary, to align along the distorted electric field. In this case, the liquid crystals 130 realigned by the protrusion 420 induce a '−' type disclination line on the domain boundary. Thus, when the protrusion 420 is formed on the domain boundary, rubbing directions of upper and lower alignment layers 400a and 400b constructing two domain should be changed opposite to the rubbing direction used with the slit. As the disclination line is induced to the '−' shape, the size of a black matrix 425 formed on the upper substrate 100 to block the disclination line may be reduced. Hence, an aperture ratio can be increased in inverse proportion to the case that the area occupied by the black matrix 425 is reduced.

Accordingly, the present invention forms two domains having opposite rubbing directions of alignment layers and the slit or protrusion on the domain boundary to change the disclination line into a straight-line shape. Therefore, the present invention reduces the area occupied by the black matrix, thereby enabling to improve the aperture ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-domain liquid crystal display device, comprising:
   first and second substrates;
   gate and data lines arranged to cross with each other on the first substrate to define a pixel region;
   a liquid crystal layer between the first and second substrates;

first and second alignment layers having opposite rubbing directions on the first and second substrates for causing liquid crystal molecules in the liquid crystal layer to form at least two domains having different liquid crystal alignment directions in the pixel; and at least three electric field distorting means on a domain boundary of the pixel, wherein two electric field distorting means extend to edges of the pixel region and the remaining one electric field distorting means is located at a central portion of the domain boundary.

2. The device of claim 1, wherein the electric field distorting means comprises at least one slit.

3. The device of claim 1, wherein the electric field distorting means comprises a protrusion.

4. The device of claim 3, wherein the protrusion has a linear shape on the boundary of the two domains.

5. The device of claim 1, wherein the electric field distorting means is formed on one of the first and second substrates.

6. The device of claim 1, wherein a thin film transistor and a pixel electrode are formed on the first substrate.

7. The device of claim 6, wherein the thin film transistor comprising:
a gate electrode;
a gate insulating layer on the gate electrode;
a semiconductor layer on the gate insulating layer; and
source/drain electrodes on the semiconductor layer.

8. The device of claim 1, wherein a color filter, a black matrix, and a common electrode are formed on the second substrate.

9. The device of claim 8, wherein the black matrix is formed on the boundary of the two domains.

10. A multi-domain liquid crystal display device, comprising:
first and second substrates;
gate and data lines arranged to cross with each other on the first substrate to define a pixel region;
a pixel electrode on one of the first and second substrates;
a common electrode on another of the first and second substrates;
a liquid crystal layer between the first and second substrates,
first and second alignment layers having opposite rubbing directions on the first and second substrates for causing liquid crystal molecules in the liquid crystal layer to form at least two domains, each domain having different liquid crystal alignment directions in the pixel; and
at least three electric field distorting means on a domain boundary of the pixel on one of the first and second substrates, the electric field distorting means being parallel to the boundary between the two domains such that a linear disclination is formed at the boundary between the two domains when a vertical electric field is formed between the common electrode and the pixel electrode,
wherein two electric field distorting means extend to edges of the pixel region and the remaining one electric field distorting means is located at a central portion of the domain boundary.

11. The device of claim 10, wherein the electric field distorting means is formed at the pixel electrode.

12. The device of claim 10, wherein the electric field distorting means is formed at the common electrode.

13. The device of claim 10, wherein the electric field distorting means comprises at least one slit.

14. The device of claim 10, wherein the electric field distorting means comprises a protrusion.

15. The device of claim 14, wherein the protrusion has a linear shape on the boundary of the domains.

16. The device of claim 15, wherein the thin film transistor comprising:
a gate electrode;
a gate insulating layer on the gate electrode;
a semiconductor layer on the gate insulating layer; and
source/drain electrodes on the semiconductor layer.

17. The device of claim 10, wherein the electric field distorting means is formed on one of the first and second substrates.

18. The device of claim 10, wherein a thin film transistor is formed on the same substrate as the pixel electrode.

19. The device of claim 10, wherein a color filter, a black matrix, and a common electrode are formed on the second substrate.

20. The device of claim 19, wherein the black matrix is formed on the boundary of the domains.

* * * * *